United States Patent [19]
Jenkins

[11] Patent Number: 5,138,682
[45] Date of Patent: Aug. 11, 1992

[54] FIBRE-OPTIC CABLE ASSEMBLIES
[75] Inventor: Shirley M. Jenkins, Farnborough, England
[73] Assignee: Smiths Industries Public Limited Company, London, England
[21] Appl. No.: 703,782
[22] Filed: May 21, 1991
[30] Foreign Application Priority Data
   Jun. 7, 1990 [GB] United Kingdom ............... 9012695
[51] Int. Cl.⁵ .............................................. G02B 6/44
[52] U.S. Cl. .................................................. 385/100
[58] Field of Search .................................. 350/96.23
[56] References Cited

U.S. PATENT DOCUMENTS 3,834,865 10/1974 Nath .
4,129,356 12/1978 Oestreich .................. 350/96.23
4,182,547 1/1980 Siegmund .
4,577,925 3/1986 Winter et al. .............. 350/96.23
4,651,917 3/1987 Gould et al. ............... 350/96.23 X

FOREIGN PATENT DOCUMENTS 0096580 12/1983 European Pat. Off. .
2145921 3/1973 Fed. Rep. of Germany .
2801441 8/1978 Fed. Rep. of Germany .

OTHER PUBLICATIONS

Japan Patent Abstracts, vol. 10, No. 106, p. 449, Nov. 1985 (Kumagai).
Japan Patent Abstracts, vol. 12, No. 366, p. 765, May 1988 (Tadahiro).

*Primary Examiner*—Akm E. Ullah
*Attorney, Agent, or Firm*—Pollock, VandeSande and Priddy

[57] ABSTRACT

Opposite ends of a fibre-optic cable have terminations including a metal diaphragm which is welded or brazed at its outer edge to the termination. The diaphragm has a central aperture into which extends the ends of a bundle of optical fibres, the fibres being hermetically sealed together at their end and sealed in the aperture by a glass seal. The diaphragm tapers in thickness from its outer edge to its central aperture where it is thinner and is flexible to accommodate relative displacement between the fibre bundle and the sheath of the cable.

10 Claims, 1 Drawing Sheet

FIBRE-OPTIC CABLE ASSEMBLIES

BACKGROUND OF THE INVENTION

This invention relates to fibre-optic cable assemblies.

Fibre-optic cable assemblies comprise one or more optical fibres extending within an outer sheath provided with a termination in which the or each fibre is retained. In high temperature applications the fibres are typically of silica and the sheath includes a metal tube, so they have dissimilar coefficents of expansion. This can lead to difficulties at the terminations because, if the tube is rigid axially, the terminations must allow some relative longitudinal movement between the termination and fibre in order to accommodate differential thermal expansion between the fibre and sheath. Flexing of the cable can also lead to relative longitudinal movement between the fibres and sheath. The difficulties are increased because of the need to maintain the fibres accurately located within the termination for maximum efficiency of optical coupling. It is also desirable to prevent sliding movement both between the fibres and over any part of the termination because this can lead to wear and fatigue. The termination should, furthermore, provide an effective seal with the fibres in order to prevent ingress of contaminants to the cable.

BRIEF SUMMARY OF THE INVENTION

It is an object of the present invention to provide a fibre-optic cable assembly that can be used to alleviate these difficulties.

According to the present invention there is provided a fibre-optic cable assembly including an outer sheath, a bundle of at least one optical fibre that extends along its length within the outer sheath and the sheath having a tubular termination at one end at least joined with or being a part of the sheath, the assembly including a flexible diaphragm sealed around its outer edge with the termination to extend transversely of the assembly, and the diaphragm having an aperture in a central region into which the fibre bundle extends and is sealed such that relative longitudinal displacement between the fibre bundle and the sheath is accommodated by flexing of the diaphragm.

The thickness of the diaphragm preferably tapers from being thinner around its central aperture to being thicker around its outer edge. The diaphragm may be approximately 50 micron thick around its central aperture and approximately 300 micron thick around its outer edge. The seal between the fibre bundle and the diaphragm is preferably of a glass material. The diaphragm may be of a metal and the termination may be of metal, the seal between the outer edge of the diaphragm and the termination being a braze or a weld. The termination may include a lens sealed around its edge in the termination forwardly of the diaphragm. The fibre bundle preferably includes a plurality of fibres, the fibres being hermetically sealed together in the region of the diaphragm. The assembly preferably has a substantially identical termination at each end.

A fibre-optic cable in accordance with the present invention, will now be described, by way of example, with reference to the accompanying drawings.

DESCRIPTION OF THE PREFERRED EMBODIMENTS

Figure 1:
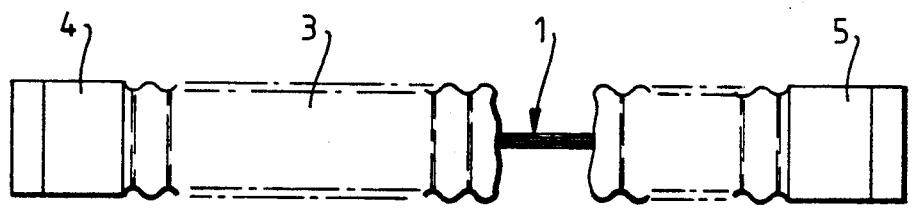
FIG. 1 is a side elevation view of the cable.
Figure 2:
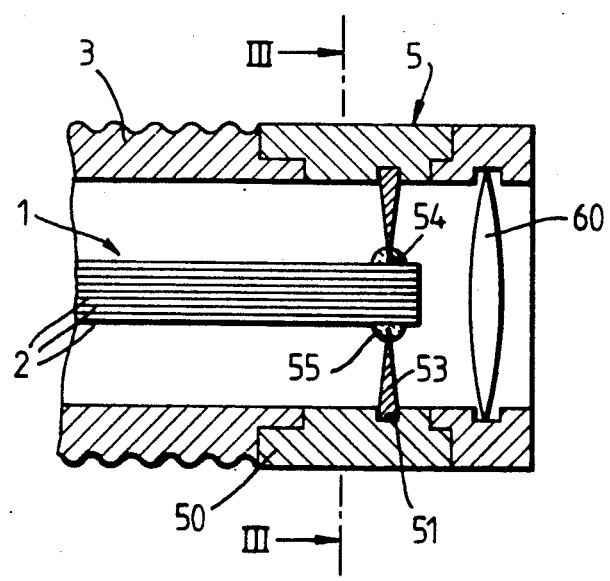
FIG. 2 is a sectional side elevation view of one end of the cable to an enlarged scale.
Figure 3:
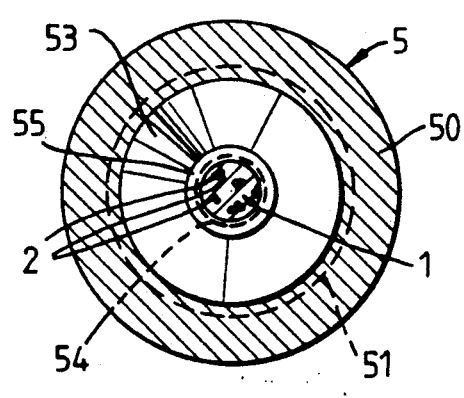
FIG. 3 is a transverse section along the line III—III of FIG. 2.

The cable assembly comprises a bundle 1 of about twenty silica optical fibres 2 which extend within an outer sheath 3 formed by a tube of stainless steel. The sheath is circumferentially corrugated to enable it to bend but is relatively rigid axially. At opposite ends, the fibre bundle 1 is joined into respective terminations 4 and 5 which are of identical construction.

The termination 5 comprises a tubular, stainless steel collar 50 of circular section which is electron beam welded about its rear end into the forward end of the sheath 3. An annular groove 51 is formed around the inside of collar 50 which receives the outer edge of a flexible, metal diaphragm 53 such as of copper, platinum or tungsten and which is welded or brazed into the groove. The diaphragm 53 has a circular aperture 54 in a central region of the diaphragm, the aperture being slightly larger in diameter than the bundle 1 by about 100 micron. The diaphragm 53 tapers in thickness from its outer edge where it is about 300 micron thick to the edge of the aperture 54 where it is about 50 micron thick. The forward end of the fibre bundle 1 projects through the aperture 54 in the diaphragm 53 by a short distance and is sealed to the diaphragm around the aperture by a glass seal 55. At its forward end, in the region of the diaphragm 53, the fibre bundle 1 preferably has its individual fibres 2 fused together so that an hermetic seal is produced between the fibres and the collar 50 across the diaphragm.

The collar 50 also supports an optical converging lens 60 which is sealed around its outer edge at a location forwardly of the end of the bundle 1. The seal of the lens 60 with the collar 50 further improves the integrity of the seal of the termination 5.

In use, differential thermal expansion between the sheath 3 and the fibre bundle 1 causes longitudinal movement of the bundle within the termination which is accommodated by flexing of the central region of the diaphragm 53 with respect to its outer edge.

It is not essential for both terminations 4 and 5 to be the same since, if only one termination fixedly locates the fibre bundle, any relative displacement could be accommodated by the other termination.

The cable is made by first sealing the ends of the fibre bundle 1 by wetting the ends with powdered glass in a liquid suspension. The outside of the bundle is coated with the sealing glass to a thickness of between about 75 micron and 125 micron. The bundle 1 is fired so that the sealing glass is strongly fused to the fibres 2 and the fibres are locked with one another at the ends to prevent lateral movement of the inner fibres. An end of the bundle 1 is pushed into the aperture 54 of the diaphragm 53 and sealed to it by applying heat and an additional glass material. The outer edge of the diaphragm 53 is then welded or brazed into the groove 51 in the collar 50. The front face of the fibre bundle 1 is then ground flat and the lens 60 assembled.

It will be appreciated that alternative methods of assembly could be used.

What I claim is:

1. A fibre-optic cable assembly of the kind including an outer sheath, a fibre bundle of at least one optical fibre that extends along its length within the outer sheath and the sheath having a tubular termination at one end, the improvement wherein the assembly includes a flexible, planar diaphragm extending transversely of the assembly, the diaphragm having an aperture in a central region thereof and an outer edge, a first seal with the termination around the outer edge of the diaphragm, one end of the fibre bundle extending into the aperture of the diaphragm and terminating adjacent the diaphragm, and the assembly including a second seal between the aperture and the fibre bundle such that relative longitudinal displacement between the fibre bundle and the sheath is accommodated by flexing of the diaphragm.

2. A fibre-optic cable assembly to claim 1, wherein the thickness of the diaphragm tapers from being thinner around its central aperture to being thicker around its outer edge.

3. A fibre-optic cable assembly according to claim 2, wherein the diaphragm is approximately 50 micron thick around its central aperture and approximately 300 micron thick around its outer edge.

4. A fibre-optic cable assembly according to claim 1, wherein said second seal between the fibre bundle and the diaphragm is of a glass material 5. A fibre-optic cable assembly according to claim 1, wherein the diaphragm is of a metal.

6. A fibre-optic cable assembly according to claim 5, wherein the termination is of a metal, and wherein said first seal between the outer edge of the diaphragm and the termination is selected from a group comprising a braze and a weld.

7. A fibre-optic cable assembly according to claim 1, wherein the termination includes a lens mounted in the termination forwardly of the diaphragm, and a seal with the termination around an edge of the lens.

8. A fibre-optic cable assembly according to claim 7, wherein the fibre bundle includes a plurality of fibres hermetically sealed together in the region of the diaphragm.

9. A fibre-optic cable assembly according to claim 1, including a substantially identical termination at each end of the fibre bundle.

10. A fibre-optic cable assembly comprising: an outer flexible sheath, a bundle of a plurality of optical fibres extending along its length within the sheath, a tubular termination at one end at least of the sheath, the termination including a flexible, planar metal diaphragm extending transversely of the assembly, the diaphragm having a central aperture and an outer edge and tapering in thickness from being thinner around its central aperture to being thicker around its outer edge, and a seal with the termination around the outer edge of the diaphragm, said one end of the fibre handle extending into the central aperture of the diaphragm and terminating adjacent the diaphragm, and the assembly including a seal between the central aperture and the fibre bundle such that relative longitudinal displacement between the fibre bundle and the sheath is accommodated by flexing of the diaphragm.

* * * * *